(12) United States Patent
Asai

(10) Patent No.: US 11,592,038 B2
(45) Date of Patent: Feb. 28, 2023

(54) REGULATOR UNIT

(71) Applicant: TAIKOH CO., LTD., Toyota (JP)

(72) Inventor: Yasuharu Asai, Toyota (JP)

(73) Assignee: TAIKOH CO., LTD., Toyota (JP)

( * ) Notice: Subject to any disclaimer, the term of this patent is extended or adjusted under 35 U.S.C. 154(b) by 0 days.

(21) Appl. No.: 17/692,503

(22) Filed: Mar. 11, 2022

(65) Prior Publication Data

US 2022/0307525 A1 Sep. 29, 2022

(51) Int. Cl.
*F16K 31/60* (2006.01)
*F15B 15/20* (2006.01)
*G05D 16/06* (2006.01)

(52) U.S. Cl.
CPC ............ *F15B 15/20* (2013.01); *F16K 31/602* (2013.01); *G05D 16/0636* (2013.01); *Y10T 137/7793* (2015.04); *Y10T 137/7809* (2015.04)

(58) Field of Classification Search
CPC ... F15B 15/20; F16K 31/602; G05D 16/0636; Y10T 137/7793
See application file for complete search history.

(56) References Cited

U.S. PATENT DOCUMENTS

| 1,480,909 | A | * | 1/1924 | Johnson | G05D 16/10 137/227 |
| 2,642,892 | A | * | 6/1953 | Simons | G05D 7/0133 137/540 |
| 9,429,958 | B2 | * | 8/2016 | Asai | F16K 31/602 |

FOREIGN PATENT DOCUMENTS

| JP | 4729359 B2 | | 4/2011 |
| JP | 4729360 B2 | * | 7/2011 |
| JP | 6209535 B2 | | 9/2017 |

\* cited by examiner

*Primary Examiner* — Thomas E Lazo
(74) *Attorney, Agent, or Firm* — Schmeiser, Olsen & Watts, LLP

(57) ABSTRACT

Provided is a regulator unit that when a pressure is set with respect to a workpiece having a certain weight, can be used for raising/lowering, suspension, or the like of a workpiece having a weight exceeding the weight with the set pressure maintained. The regulator unit is disposed between a drive cylinder and a fluid pressure source and includes a regulator body and a pressure control mechanism connected to the regulator body. The pressure control mechanism includes a cylindrical housing, an end surface cover, and an operation handle fixed to an end of a screw rod protruding from the end surface cover. The end surface cover is fixed to a resin ring fitted to an end of the cylindrical housing and is slidingly rotatable with respect to the end surface of the cylindrical housing integrally with the resin ring in accordance with the amount of turn of the operation handle.

6 Claims, 5 Drawing Sheets

REGULATOR UNIT

CROSS-REFERENCE TO RELATED APPLICATIONS

This application claims priority to Japanese Application No. 2021-56001, having a filing date of Mar. 29, 2021, the entire contents of which are hereby incorporated by reference.

FIELD OF TECHNOLOGY

The following relates to a regulator unit. More specifically, the following relates to a regulator unit that when an operator raises or lowers a cylinder lift table having a workpiece placed thereon, for example, at a vehicle assembly plant or the like, allows the operator to obtain a desired raise/lower speed or stop the workpiece in a desired position by controlling the pressure of fluid supplied to the cylinder with a simple operation.

BACKGROUND

For example, when raising or lowering an air-cylinder lift table having a workpiece placed thereon, as described above, a constant air pressure is supplied to the air cylinder. However, keeping the raise/lower speed of the lift table approximately constant requires supplying air to the air cylinder while always changing the air pressure, and there is a difference between the required air pressure and the supplied constant air pressure. This makes the raise/lower speed of the lift table inconstant, resulting in various inconveniences.

To avoid such inconveniences, a cylinder pressure control unit has been proposed that is able to keep the raise/lower speed of a lift table or the like approximately constant by controlling the pressure of fluid supplied to a cylinder through a regulator (see Japanese Patent No. 4729359).

This cylinder pressure control unit controls the pressure of fluid supplied to the cylinder using the regulator and includes pressure change means disposed between a cylinder rod and the regulator and configured to freely change the pressure set by the regulator in accordance with advance/retreat movement of the cylinder rod. The pressure change means includes a control spring disposed on the regulator and configured to change the pressure set on the cylinder by expanding and contracting and a coupling member including a rack for expanding and contracting the control spring and a spur gear engaged with the rack.

Unfortunately, this cylinder pressure unit includes a large number of parts, has a complicated structure, and is large in size. In particular, an air cylinder on which the initial pressure is to be set protrudes long and therefore a corresponding space is required. Also, an operator has difficulty in raising and lowering a workpiece at a desired raise/lower speed or quickly positioning a workpiece and stopping it in a desired position by continuously operating the cylinder pressure.

To solve these problems, the present applicant previously proposed and put into practical use a regulator unit that has a simple and compact configuration and allows an operator to raise and lower a workpiece at a desired raise/lower speed or quickly position a workpiece and stop it in a desired position by continuously operating the cylinder pressure (Japanese Patent No. 6209535). The proposed regulator unit allows an operator to make the raise/lower speed of a lift table constant, change the speed, or stop a workpiece in any position by changing the pressure set by a regulator body when necessary by turning an operation handle.

However, in the case of this regulator unit, the operator sets a pressure corresponding to the weight (e.g., 10 kg) of a workpiece before use, and the operation handle is regulated by a stopper so as to turn in the set range. In other words, this apparatus allows the operator to control the pressure using the operation handle only in the range regulated by the stopper. For this reason, the operator cannot use this apparatus with respect to a workpiece having a different weight (e.g., 15 kg) with the set pressure maintained.

SUMMARY

As described above, the proposed regulator unit has difficulty in being generally used with respect to workpieces having different weights for raising/lowering, suspension, or other purposes. An aspect relates to a regulator unit that does not have such a problem, that is, a regulator unit that even when a pressure is set with respect to a workpiece having a certain weight, is allowed to be used for raising/lowering, suspension, or the like of a workpiece having a weight exceeding the weight with the set pressure maintained.

To solve the above problem, one aspect of embodiments of the present invention provides a regulator unit disposed between a drive cylinder and a fluid pressure source. The regulator unit includes a regulator body and a pressure control mechanism connected to the regulator body. The pressure control mechanism includes a cylindrical housing through which a stepped hole including a small diameter hole and a large diameter hole is formed and in which a control spring is housed in the small diameter hole and a collar-provided nut and a screw rod screwed into the collar-provided nut are disposed in the large diameter hole, an end surface cover closing an end surface opposite to a surface of the cylindrical housing on which the regulator body is mounted, and an operation handle fixed to an end of the screw rod protruding from the end surface cover and configured to operate so as to expand and contract the control spring. The end surface cover is fixed to a resin ring fitted to an end of the cylindrical housing and is slidingly rotatable with respect to the end surface of the cylindrical housing integrally with the resin ring in accordance with the amount of turn of the operation handle.

In one embodiment, a retaining flange is formed by increasing a diameter of the end of the cylindrical housing, and the end surface cover and the resin ring are coupled to each other with the retaining flange sandwiched therebetween. Also, a step to be touched by the retaining flange is formed on an inner circumferential surface of the resin ring.

In one embodiment, a plunger for reinforcing friction between the resin ring and an outer circumferential surface of the cylindrical housing is embedded in the resin ring.

In one embodiment, the operation handle is fixed to the end of the screw rod through a friction fastener. Also, the operation handle has a function of automatically returning the operation handle to a center position after the operation handle is turned.

The regulator unit according to the one aspect of embodiments of the present invention is configured as described above. Thus, even when a pressure is set with respect to a workpiece having a certain weight, this regulator unit is allowed to be used for raising/lowering, suspension, or the like of a workpiece having a weight exceeding the weight with the set pressure maintained.

BRIEF DESCRIPTION

Some of the embodiments will be described in detail, with reference to the following figures, wherein like designations denote like members, wherein.

DETAILED DESCRIPTION

An embodiment of the present invention will be described with reference to the accompanying drawings. A regulator unit according to the present embodiment is disposed between the drive cylinder and fluid pressure source of a lift table on which a workpiece is placed or a lift for hoisting a heavy object, for example, at a vehicle assembly plant or the like. This regulator unit is used to control the pressure of fluid supplied to the drive cylinder when raising and lowering the lift table or hoisting a heavy object using the lift. The fluid pressure is pneumatic pressure or hydraulic pressure. While a case in which pneumatic pressure is used is described below, similar effects will be obtained even when hydraulic pressure is used.

Figure 1:
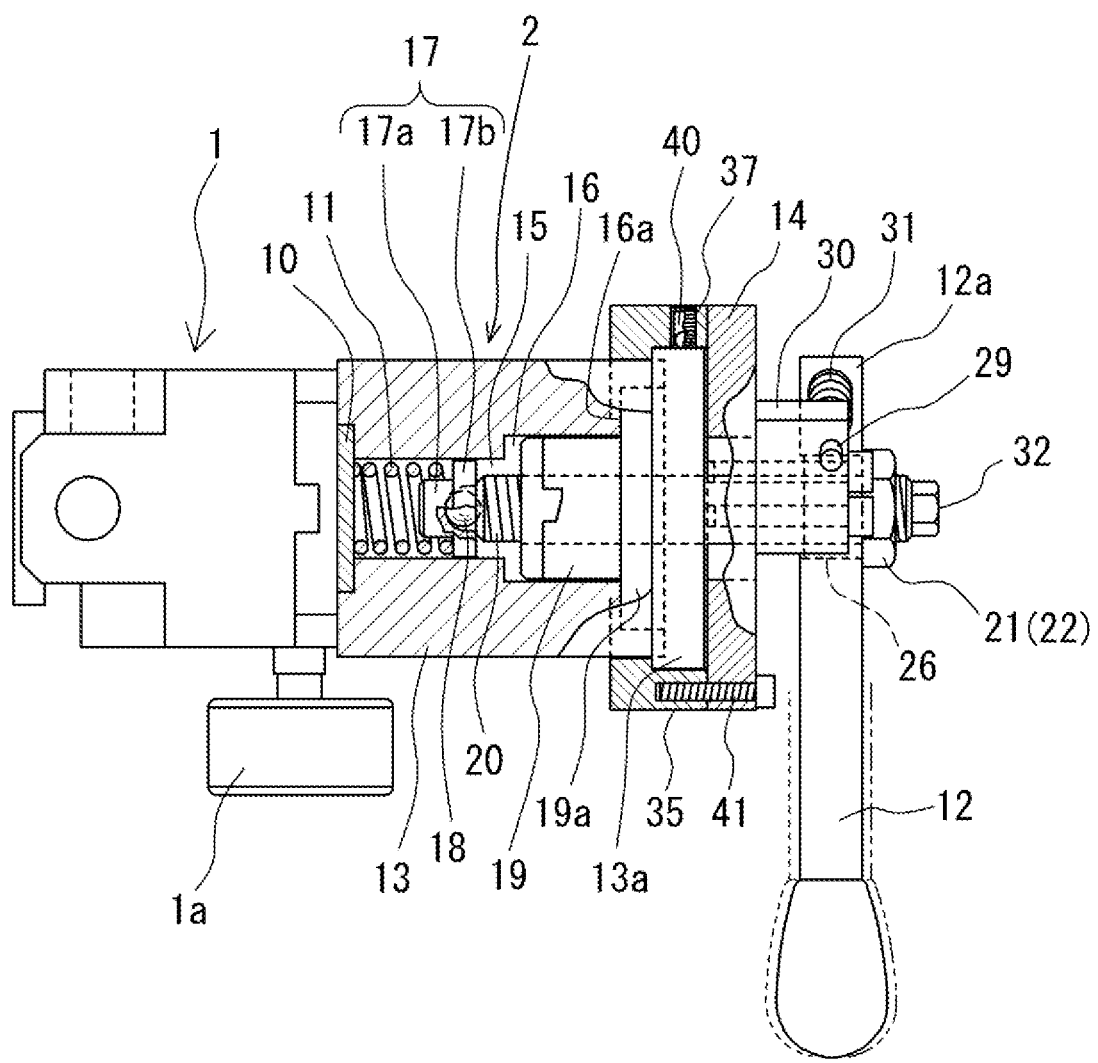
FIG. 1 is a partial plan view showing the configuration of a regulator unit according to an embodiment of the present invention.

As shown in FIG. 1, this regulator unit includes a regulator body 1 and a pressure control mechanism 2 connected thereto. The regulator body 1 is disposed on, for example, the air supply path between a drive air cylinder (not shown) and an air tank (not shown) and has an air inlet (primary side) communicating with the air tank and an air outlet (secondary side) connected to the drive air cylinder. A diaphragm (not shown) is disposed in the regulator body 1 so as to come into contact with the primary side and secondary side of the air flow path, and a diaphragm receiving plate 10 fixed to the diaphragm is exposed toward the pressure control mechanism 2. A reference sign 1a in FIG. 1 represents a pressure gauge.

The pressure control mechanism 2 includes a cylindrical housing 13 housing a control spring 11, an end surface cover 14 closing the end surface opposite to the surface of the cylindrical housing 13 on which the regulator body 1 is mounted, and an operation handle 12 mounted on the outside of the end surface cover 14. A stepped hole including a small diameter hole 15 and a large diameter hole 16 penetrates the cylindrical housing 13, and the control spring 11 is housed in the small diameter hole 15, which is open toward the regulator body 1, so as to be expandable.

One end surface of the control spring 11 is in contact with the diaphragm receiving plate 10, and the other end surface is in contact with a sliding piece 17. The elastic force of the control spring 11 acts on the diaphragm receiving plate 10 and sliding piece 17. The sliding piece 17 includes a shaft 17a and a flange 17b. The shaft 17a is housed inside the control spring 11, and the flange 17b receives the end surface of the control spring 11. Thus, the sliding piece 17 is always energized outward (toward the operation handle 12) by the control spring 11. A steel ball holding recess is formed in the central portion of the flange 17b, and a steel ball 18 is movably housed and held therein. The sliding piece 17 slides in the small diameter hole 15 with the peripheral surface of the flange 17b being in sliding contact with the inner circumferential surface of the small diameter hole 15.

A collar-provided nut 19 and a screw rod 20 screwed thereinto are inserted in the large diameter hole 16 of the cylindrical housing 13. The rear end of the screw rod 20 protrudes from the end surface cover 14, and the operation handle 12 that operates so as to expand and contract the control spring 11 is mounted on the rear end.

Figure 4A:
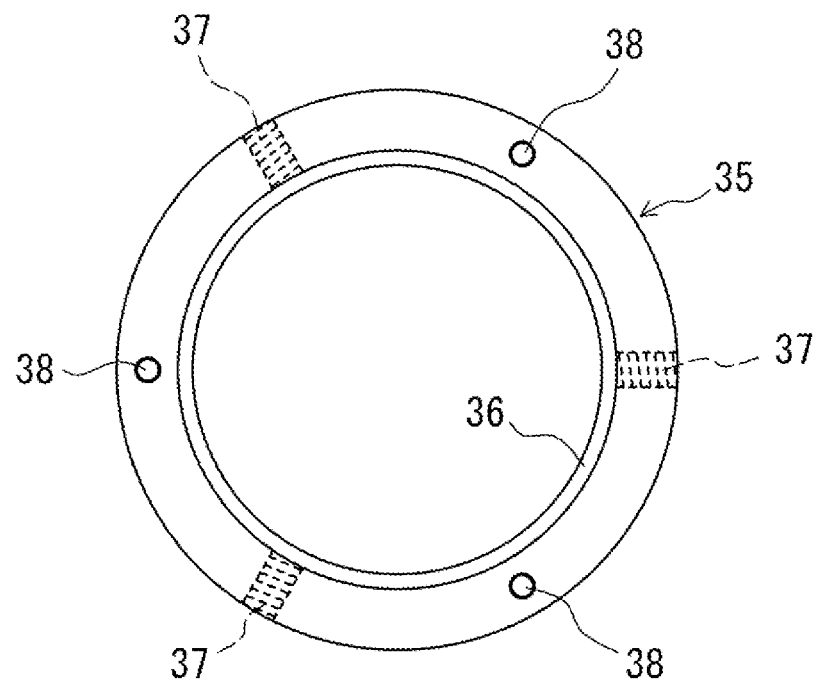
FIG. 4A is a front view showing the shape of a resin ring in the regulator unit according to the present embodiment.
Figure 4B:
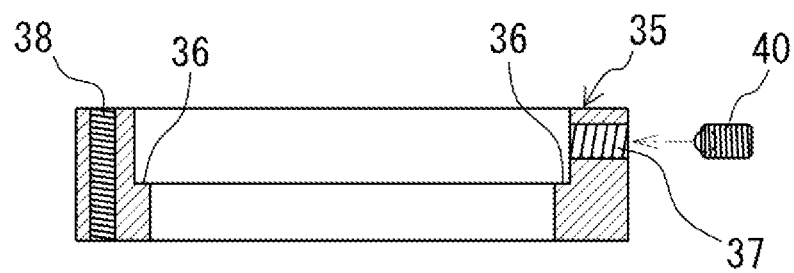
FIG. 4B is a longitudinal sectional view showing the shape of the resin ring in the regulator unit according to the present embodiment.

The end surface cover 14 is fixed to a resin ring 35 that is made of MC nylon® or the like and fitted to the end of the cylindrical housing 13 so as to be slidingly rotatable. Thus, the end surface cover 14 is able to slidingly rotate with respect to the end surface of the cylindrical housing 13 integrally with the resin ring 35. As will be described later, multiple (three in FIG. 4) female thread holes 38 into which coupling screws 41 for integrating the resin ring 35 with the end surface cover 14 are screwed are formed in the resin ring 35 so as to pass from one end surface to the other end surface. In an embodiment, a step 36 is formed in the inner circumferential surface of the resin ring 35, and multiple (three in FIG. 4) female thread holes 37 into which plungers 40 are screwed are formed in the resin ring 35 so as to extend radially from the outer circumferential surface to the inner circumferential surface.

In an embodiment, a retaining flange 13a that touches the step 36 of the inner circumferential surface of the resin ring 35 is formed by increasing the diameter of the end of the cylindrical housing 13. This configuration reliably prevents the resin ring 35 from coming out of the end of the cylindrical housing 13. Although the resin ring 35 is fixedly held on the end of the cylindrical housing 13 by the friction between the inner circumferential surface thereof and the outer circumferential surface of the cylindrical housing 13, the friction decreases due to the wear of the inner circumferential surface caused by repeated slides. In this case, friction is ensured by screwing the plungers 40 and pressing balls (or pins) on the tips of the plungers 40 against the outer circumferential surface of the cylindrical housing 13.

Figure 5A:
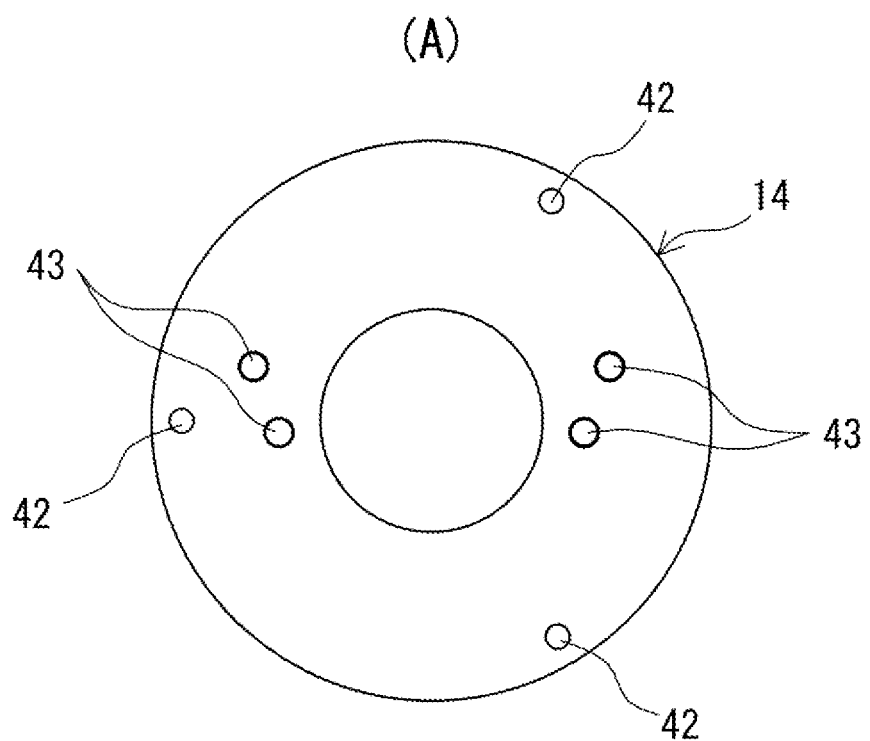
FIG. 5A is a front view showing the shape of an end surface cover in the regulator unit according to the present embodiment.
Figure 5B:
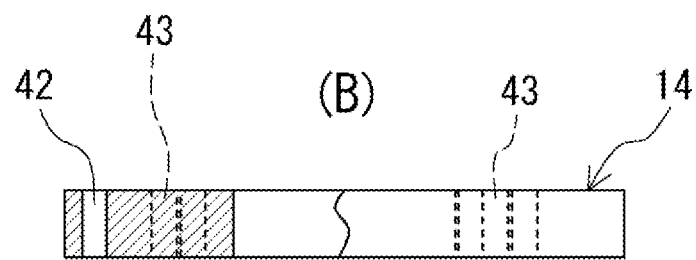
FIG. 5B is a partial sectional plan view showing the shape of the end surface cover in the regulator unit according to the present embodiment.

The end surface cover 14 is in a doughnut shape having the same diameter as the resin ring 35, and screw insertion holes 42 into which the coupling screws 41 are inserted are formed so as to communicate with the female thread holes 38 of the resin ring 35 (see FIG. 5). By screwing the coupling screws 41 into the female thread holes 38 of the resin ring 35 through the screw insertion holes 42 and tightening them, the end surface cover 14 and resin ring 35 are coupled to each other with the retaining flange 13a of the cylindrical housing 13 sandwiched therebetween and fitted to the end surface of the cylindrical housing 13 so as to be slidingly rotatable with respect to the end surface. Also, stopper fixing holes 43 to which a pair of stoppers 29 and 29a for regulating the turn range of the operation handle 12 are fixed are formed in the end surface cover 14.

The collar-provided nut 19 is fitted into the large diameter hole 16 such that the collar 19a thereof is seated on a step 16a formed on the entrance side of the large diameter hole 16 and is pressed by the end surface cover 14 that closes the end surface of the cylindrical housing 13.

The top surface of the screw rod 20 comes into contact with the steel ball 18 housed in the steel ball holding recess of the sliding piece 17. The reason why the top surface of the screw rod 20 is caused to come into contact with the spherical surface of the steel ball 18 rather than directly come into contact with the flange 17b is that doing so ensures smooth rotation of the screw rod 20 by reducing the friction against the top surface of the screw rod 20 and prevents the top of the screw rod 20 and the flange 17b from wearing down each other with time.

Figure 3A:
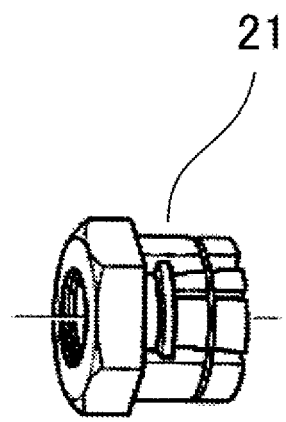
FIG. 3A is a perspective view showing an example of the configuration of a fastener used in the regulator unit according to the present embodiment.
Figure 3B:
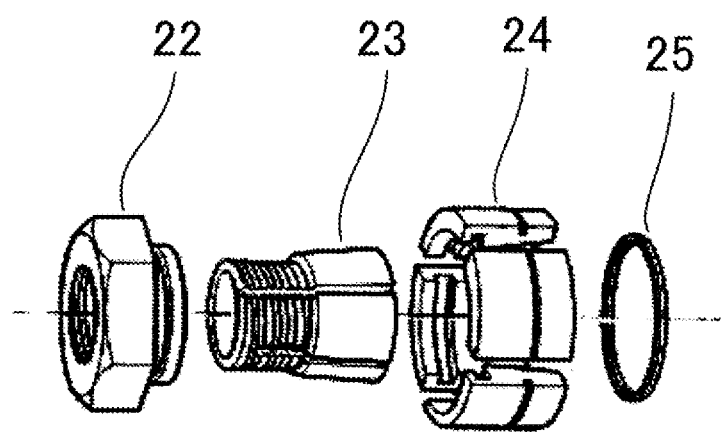
FIG. 3B is an exploded perspective view showing the example of the configuration of the fastener used in the regulator unit of the present embodiment.

The operation handle 12 is mounted on the rear end of the screw rod 20 through a fastener 21. What is recommended as the fastener 21 is a friction fastener (power lock) including a nut 22, a slotted inner ring 23 a half of which is screwed into the nut 22, an outer ring 24 that is divided into multiple pieces and is mounted on the nut 22 so as to cover the other half of the inner ring 23, and a ring spring 25 that is hung around the outer ring 24 (see FIG. 3).

In the case of this power lock, the screw rod 20 is inserted into the inner ring 23, and the outer ring 24 is fitted into a through hole 26 formed in the operation handle 12. Thus, the operation handle 12 is firmly mounted on the rear end of the screw rod 20 (see FIG. 1). The circumferential surfaces of the inner ring 23 and outer ring 24 in contact with each other are tapered circumferential surfaces corresponding to each other. For this reason, the outer ring 24 moves forward or rearward with respect to the inner ring 23 as the nut 22 screws forward or rearward. Thus, the fastening force of the inner ring 23 with respect to the screw rod 20 is increased or reduced, and the pressing force of the outer ring 24 with respect to the circumferential surface of the through hole 26 of the operation handle 12 is increased.

A hex head screw 32 is fixed to the rear end surface of the screw rod 20, or the rear end of the screw rod 20 is formed in a hex head screw shape, or a hex head screw hole is formed in the rear end surface of the screw rod 20 in a recessed manner. Thus, the screw rod 20 is allowed to be rotated using the hex head screw 32 or hex head screw hole. The rotation of the screw rod 20 is performed with the nut 22 loosened.

While the swing range of the operation handle 12 is regulated to, for example, 45° (each 22.5° upward and downward from the center, in which the operation handle 12 is horizontal) by the stoppers 29 and 29a described below, the operation handle 12 of the regulator unit according to the present embodiment is allowed to swing beyond the regulated range.

The operation handle 12 is provided with a centering mechanism that automatically returns the operation handle 12 from the swing position to the center. In the centering mechanism, a pair of stopper mounting members 30 and 30a provided with the stoppers 29 and 29a defining the swing ends of the operation handle 12 are fixed to the end surface cover 14, return springs 31 and 31a are disposed on the stoppers 29 and 29a, and ends of the return springs 31 and 31a are pressed against the end protrusions 12a of the operation handle 12. Since the restoring force of the control spring 11 acts on the screw rod 20 through the sliding piece 17, it is not essential to dispose one of the return springs, 31a. Even if the return spring 31a is disposed, the spring pressure thereof may be weaker than that of the return spring 31.

Figure 2:
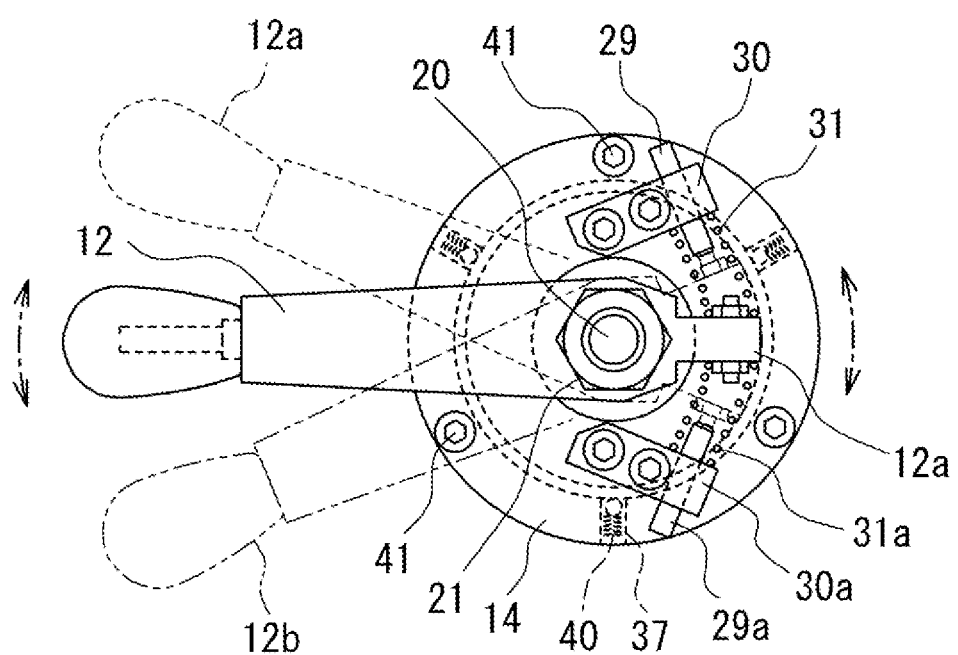
FIG. 2 is a side view showing the configuration of the regulator unit according to the present embodiment.

In the case of this centering mechanism, when the operation handle 12 located in the center shown by a solid line in FIG. 2 is turned downward against the elastic force of the return spring 31 (see the operation handle 12b shown by a two-dot chain line), the return spring 31 is pushed and contracted and then the end protrusion 12a of the operation handle 12 comes into contact with the stopper 29. Thus, further turn of the operation handle 12 is stopped. Then, when the downward force applied to the operation handle 12 in this position is reduced, the operation handle 12 is pushed by the elastic force of the return spring 31 and returned to the center.

In contrast, when the operation handle 12 located in the center shown by a solid line in FIG. 2 is turned upward against the elastic force of the return spring 31a (see the operation handle 12a shown by a broken line), the return spring 31 is pushed and contracted and then the end protrusion 12a of the operation handle 12 comes into contact with the stopper 29a. Thus, further turn of the operation handle 12 is stopped. Then, when the upward force applied to the operation handle 12 in this position is reduced, the operation handle 12 is returned to the center by the elastic force of the control spring 11 and return spring 31a. In this case, the operation handle 12 can be returned to the center even by only the action of the control spring 11. For this reason, as described above, the return spring 31a may be omitted. As will be described later, the operation handle 12 slightly advances or retreats in the axial direction of the screw rod 20 (between a broken line and a two-dot chain line in FIG. 1) as it is turned, and the restoring force of the control spring 11 contributes to the retreat movement.

It is assumed that the regulator unit according to the present embodiment thus configured is disposed on, for example, the air supply path of the drive air cylinder of a lift table for raising and lowering a workpiece. In this case, first, by expanding or contracting the control spring 11, the initial pressure applied to the drive air cylinder by the regulator body 1 is set with respect to a case in which no load is put on the drive air cylinder (that is, no workpiece is present on the lift table) and a case in which a load is put on the drive air cylinder (that is, a workpiece is present on the lift table).

These settings are made as follows: the spring pressure applied to the diaphragm receiving plate 10 is increased or reduced by rotating the screw rod 20 through the hex head screw 32 with the fastener 21 loosened and thus expanding or contracting the control spring 11; simultaneously, the balance of the lift table is observed; the operation handle 12 is located in the center when the balance is struck; and the operation handle 12 is fixed to that position by tightening the fastener 21.

After setting the initial pressure with respect to the cases of the presence and absence of a workpiece as described above, the drive air cylinder is driven. Thus, the corresponding initial pressure is supplied to the drive air cylinder and raising or lowering of the lift table is started. Then, the operator changes the pressure set by the regulator body 1 when necessary, by turning the operation handle 12. This allows the operator to make the raise/lower speed of the lift table constant change the speed or stop the lift table in any position.

That is, when the operation handle 12 is turned upward, the screw rod 20 advances and the load on the control spring 11 is increased. This increases the pressure on the secondary side and thus the raise/lower speed. In contrast, when the operation handle 12 is turned downward, the screw rod 20 retreats and the load on the control spring 11 is reduced. This reduces the pressure on the secondary side and thus the raise/lower speed.

The raise/lower speed of the lift table is increased or reduced in accordance with the turn speed of the operation handle 12. For this reason, by turning the operation handle 12 upward to a certain extent in one stroke, the operator is able to quickly raise the lift table to a certain extent. Then, by inching the operation handle 12 in that position, the operator is able to make the lift table quickly reach a desired position and stop in that position. Similarly, the operator is able to quickly position and stop the lift table in a desired lower position.

When the operator reduces the force applied to the operation handle 12 or leaves the hand from the operation handle 12 after turning the operation handle 12, the operation handle 12 is immediately returned to the center position by the restoring force of the return spring 31 or 31a and control spring 11.

It is assumed that the present regulator unit that has set the initial pressure with respect to the workpiece having the certain weight as described above is used for transfer or the like of a workpiece having a greater weight. In this case, even if the operation handle 12 is operated in the range regulated by the stoppers 29 and 29a, a sufficient pressure is not obtained. This makes it difficult to smoothly transfer the workpiece. However, in the case of the present regulator unit, the end surface cover 14 having the stoppers 29 and 29a disposed thereon is slidingly rotatable with respect to the end surface of the cylindrical housing 13 integrally with the resin ring 35. Thus, when the operation handle 12 comes into contact with the stopper 29a and then the operator attempts to further turn the operation handle 12 upward, the stopper 29a is pressed by the end protrusion 12a, resulting in rotation of the end surface cover 14.

When the end surface cover 14 rotates as described above, the operation handle 12 is turned beyond the original swing range, resulting in screwing forward of the screw rod 20. When the control spring 11 is compressed as the screw rod 20 screws forward, the pressure on the secondary side of the regulator body 1 is increased, resulting in smooth raising/lowering, suspension, or the like of the workpiece having the greater weight.

The regulator unit according to the embodiment of the present invention configured as described above is a regulator unit that even if a pressure is set with respect to a workpiece having a certain weight, is allowed to be used for raising/lowering, suspension, or the like of a workpiece having a weight exceeding the weight with the set pressure maintained, and therefore has high industrial applicability.

Although the present invention has been disclosed in the form of preferred embodiments and variations thereon, it will be understood that numerous additional modifications and variations could be made thereto without departing from the scope of the invention.

For the sake of clarity, it is to be understood that the use of 'a' or 'an' throughout this application does not exclude a plurality, and 'comprising' does not exclude other steps or elements.

The invention claimed is:

1. A regulator unit disposed between a drive cylinder and a fluid pressure source, comprising:
   a regulator body; and
   a pressure control mechanism connected to the regulator body, wherein
   the pressure control mechanism comprises:
      a cylindrical housing through which a stepped hole including a small diameter hole and a large diameter hole is formed and in which a control spring is housed in the small diameter hole and a collar-provided nut and a screw rod screwed into the collar-provided nut are disposed in the large diameter hole;
      an end surface cover closing an end surface opposite to a surface of the cylindrical housing on which the regulator body is mounted; and
      an operation handle fixed to an end of the screw rod protruding from the end surface cover and configured to operate so as to expand and contract the control spring, and
   the end surface cover is fixed to a resin ring fitted to an end of the cylindrical housing and is slidingly rotatable with respect to the end surface of the cylindrical housing integrally with the resin ring in accordance with the amount of turn of the operation handle.

2. The regulator unit of claim 1, wherein
   a retaining flange is formed by increasing a diameter of the end of the cylindrical housing, and
   the end surface cover and the resin ring are coupled to each other with the retaining flange sandwiched therebetween.

3. The regulator unit of claim 2, wherein a step to be touched by the retaining flange is formed on an inner circumferential surface of the resin ring.

4. The regulator unit of claim 1, wherein a plunger for reinforcing friction between the resin ring and an outer circumferential surface of the cylindrical housing is embedded in the resin ring.

5. The regulator unit of claim 1, wherein the operation handle is fixed to the end of the screw rod through a friction fastener.

6. The regulator unit of claim 1, wherein the operation handle has a function of automatically returning the operation handle to a center position after the operation handle is turned.

* * * * *